United States Patent Office 3,429,779
Patented Feb. 25, 1969

3,429,779
SYNTHESIS OF STEROIDS
Samuel Cheng Pan, Metuchen, Barbara Junta, Somerset, and Pacifico A. Principe, South River, N.J., assignors to E. R. Squibb & Sons, Inc., New York, N.Y., a corporation of Delaware
No Drawing. Filed Feb. 15, 1966, Ser. No. 527,487
U.S. Cl. 195—51                6 Claims
Int. Cl. C07c 169/10, 167/14, 167/08

ABSTRACT OF THE DISCLOSURE 11-ketoestranes are prepared in a two-step process by first 11-ketonizing a 19-nor-$\Delta^4$-androstene to yield the 11-keto derivative and then 1-dehydrogenating the latter.

This invention relates to and has for its object the provision of an improved process for preparing 11-ketoestranes.

It has been found that a 19-nor-$\Delta^4$-androstene may be converted to an 11-ketoestrane derivative in high yield by a two-step process without any substantial formation of undesired by-products. In essence, therefore, the process of this invention entails subjecting a 19-nor-$\Delta^4$-androstene to the action of enzymes of an 11-ketonizing microorganism, whereby a corresponding 11-keto-19-nor-$\Delta^4$-androstene derivative is formed; and subjecting the latter to the action of enzymes of a 1-dehydrogenating microorganism, to yield the desired 11-ketoestrane final product.

Among the suitable starting steroids are included any of the 19-nor-$\Delta^4$-androstenes. The preferred starting steroids, however, are the 3,17-dioxygenated-19-nor-$\Delta^4$-androstenes, such as 19-nor-$\Delta^4$-androstene-3,17-dione, 19-nortestosterone, 19-nor-17$\alpha$-methyltestosterone and 19-nor-17$\alpha$-ethynyltestosterone.

In the first step of the process of this invention, the steroid substrate is subjected to the action of enzymes of an 11-ketonizing microorganism, the reaction being carried out in the usual manner by culturing the microorganism in the presence of the steroid, or by treating the steroid with non-proliferating cells of the microorganism, or by intermixing the steroid with 11-ketonizing enzymes previously obtained from the microorganism. The conditions for such microbial reaction are well known in the art and are similar to those specified in U.S. Patent 3,179,698.

The preferred 11-ketonizing microorganism that can be used as the source of the 11-ketonizing enzyme is *Corticium microsclerotia*.

The process results in the preparation of the 11-keto-19-$\Delta^4$-androstene intermediate. The preferred intermediates are the 11-keto-3,17-dioxygenated-19-nor-$\Delta^4$-androstenes, such as 19-nor-$\Delta^4$-androstene-3,11,17-trione, 11-keto-19-nortestosterone, 11-keto-19-nor-17$\alpha$-methyltestos-10-day old agar slant cultures of *Corticium microsclerotia*

These 11-keto-19-nor-$\Delta^4$-androstenes are then subjected to the action of enzymes of 1-dehydrogenating microorganisms, to yield the desired 11-ketoestrane final products, the reaction being carried out in the usual manner by culturing the microorganism in the presence of the steroid, or by treating the steroid with nonproliferating cells of the microorganism, or by intermixing the steroid with 1-dehydrogenating enzymes previously obtained from the microorganisms. Optimally the dehydrogenation is conducted with cell-free extracts of 1-dehydrogenating microorganisms, as by the method and with the enzymes described in U.S. Patent No. 3,047,469.

The second step of the process results in the formation of the final products, namely the 11-ketoestrane derivatives, which include the 11-keto-3,17-dioxygenated estranes, such as 11-ketoestrone, 11-ketoestradiol, 11-keto-17$\alpha$-methylestradiol and 11-keto-17$\alpha$-ethynylestradiol.

The following examples illustrate the invention (all temperatures being in centigrade):

Example 1.—11-keto-19-nor-$\Delta^4$-androstene-3,17-dione

A. Fermentation.—Surface growth from each of two 10-day old agar slant cultures of *Corticium microsclerotia* (NRRL–2727), the slant containing as a nutrient medium (A):

| | Grams |
|---|---|
| Oatmeal | 20 |
| Tomato paste | 20 |
| Agar | 15 |
| Distilled water to 1 liter. | | is suspended in 6 ml. of a 0.01% sodium lauryl sulphate aqueous solution. Three ml. portions of the suspension are used to inoculate four 250 ml. conical flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |
| Distilled water to 1 liter. | |

After 72 hours of incubation at 25° with continuous rotary agitation (280 cycles/minute; 2 inch stroke) 10% (vol./vol.) transfers are made to twenty 250 ml. conical flasks, each containing 50 ml. of the following sterilized medium (C):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Distilled water to 1 liter. | |

After 24 hours of incubation, using the same conditions as described above, the steroid (500 micrograms/ml.) is added by supplementing each flask with 0.25 ml. of a sterile solution (100 mg./ml.) of 19-nor-$\Delta^4$-androstene-3,17-dione in N,N-dimethylformamide. A total of 500 mg. is fermented. After approximately 10 hours of further incubation using identical conditions as described above, the fermentation is harvested. The contents of the flasks are pooled; the broth has a volume of 1000 ml.

B. Isolation.—The broth is extracted three times with 200 ml. portions of chloroform. The combined chloroform extracts are washed with water, dried over anhydrous sodium sulfate and concentrated to dryness under vacuum, leaving about 150 mg. of crude product. This material is chromatographed on a thin layer of Silica Gel GF (Merck) with chloroform containing 5% (by volume) methanol as the developing solvent. The uv-absorbing band which moves with 8/10 the mobility of the substrate, 19-norandrostenedione, is eluted with a 1:1 (by volume) mixture of methanol and chloroform. After evaporating off the solvent the residue is partitioned between chloroform and a 1:1 (by volume) mixture of water and methanol. The chloroform phase, upon evaporation under vacuum to dryness, yields crystalline 11-keto-19-nor-$\Delta^4$-androstene-3,17-dione. It is recrystallized from acetone-hexane to yield about 50 mg. of the pure product, M.P. about 207°–209°; $[\alpha]_D + 290°$ (chloroform).

Moreover, by substituting the following steroid substrates for the 19-nor-$\Delta^4$-androstene-3,17-dione in the procedure of Example 1, the indicated product is obtained:

| Steroid Substrate | Product |
| --- | --- |
| 19-nor-17α-methyltestosterone | 11-keto-19-nor-17α-methyltestosterone. |
| 19-nor-17α-ethynyltestosterone | 11-keto-19-nor-17α-ethynyltestosterone. |
| 19-nortestosterone | 11-keto-19-nortestosterone. |

Example 2.—11-ketoestrone by growing culture of Corynebacterium simplex

A. Fermentation.—Surface growth from a two-week old agar slant of Corynebacterium simplex (ATCC 6946), the slants containing as a nutrient medium (A):

| | Grams |
| --- | --- |
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

| | Grams |
| --- | --- |
| Beef extract | 1.5 |
| Yeast extract | 3 |
| Peptone | 6 |
| Dextrose | 1 |

Distilled water to 1 liter.

After 24 hours of incubation at 25° with continuous rotary agitation (280 cycles/minute; 2 inch stroke), 5% (vol./vol.) transfers are made to eight 250 ml. Erlenmeyer flasks each containing 50 ml. of freshly sterilized medium B. After 24 hours of further incubation, using the same conditions as described above, the steroid (500 micrograms/ml.) is added by supplementing each flask with 0.25 ml. of a sterile solution (100 mg./ml.) of 11-keto-19-nor-$\Delta^4$-androstene-3,17-dione in N,N-dimethylformamide. A total of 200 mg. is fermented. After 48 hours of further incubation, using identical conditions as described above, the contents of the flasks are pooled, and the broth is extracted three times with 200 ml. portions of methyl isobutyl ketone.

The methyl isobutyl ketone extract is washed with water, dried over anhydrous $Na_2SO_4$, and evaporated under vacuum to dryness. The evaporation residue is chromatographed on a thin layer of Silica Gel GF (Merck) with chloroform containing 10% (by volume) of methanol as the developing solvent. The major phenolic band as detected by spraying the edge of the thin layer plate with a ferric ferricyanide reagent (Barton, et. al., Nature 170, 249 (1952)) is eluted with a 1:1 (by volume) methanol-chloroform. After evaporating the elute to dryness, the residue is partitioned between equal volumes of chloroform and a 1:1 (by vol.) methanol-water mixture. The chloroform phase is replaced twice and the three chloroform partitionates are combined, dried over anhydrous sodium sulfate, and evaporated to dryness. The evaporation residue is virtually pure 11-ketoestrone. It is recrystallized twice from acetone-hexane to yield about 100 mg. of the pure product, M.P. about 222°–224°, $[\alpha]_D^{23} + 384°$ (C, .21, 95% ethanol), $\gamma_{Max.}^{KBr}$ 3300, 1730, 1708, 1612, 1596, 1512 cm.$^{-1}$ Example 3.—11-ketoestrone by washed cells of Corynebacterium simplex Following the procedure of Example 2 with the exception that testosterone is used in place of 11-keto-19-norandrostenedione, the cells of the culture of Corynebacterium simplex are harvested at the end of 72 hours by centrifugation. The packed cells are washed three times with a phosphate buffer containing 0.005 mole each of $KH_2PO_4$ and $Na_2H_2P_2O_7$ per liter and adjusted to pH 7.0. The washed cells are then suspended in the same phosphate buffer to a volume equal to ¼ of the volume of the original culture. The substrate, 11-keto-19-norandrostenedione and the hydrogen acceptor, e.g. 2-methyl-naphthoquinone are added as their solutions in ethanol to give final concentrations of 100 µg./ml. and 0.4 mM. respectively, the quantity of ethanol introduced being held within 5% of the total. The reaction mixture is allowed to stand at 30° for 4–6 hours, after which it is extracted twice with ¼ of its volume of methyl isobutyl ketone. The methyl isobutyl ketone extract is processed in exactly the same manner as described in Example 3 to give pure 11-keto-estrone of M.P. 222°–224°.

Example 4.—11-ketoestrone by cell-free enzyme preparation from Corynebacterium simplex Following the procedure of Example 3, the packed cells are placed in a mortar along with an equal amount by weight of alumina (finely powdered) and treated in a Ratheon magneto-strictive oscillator for 20 minutes. The sonicated mixture is centrifuged for ten minutes at 2000×G to remove cell debris and alumina. The substrate, 11-keto-19-norandrostenedione (1 mg.) and the hydrogen acceptor, e.g. 2-methylnaphthoquinone (1 mg.) are added to 2 ml. of this cell-free ring-A dehydrogenase preparation which has been diluted to 5 ml. with pH 7.0 phosphate buffer in the same manner as described in Example 3. The mixture is allowed to stand for one hour at 30° C. after which it is twice extracted with 1 ml. of methyl isobutyl ketone. The combined extract is chromatographed on paper using propylene glycol as the stationary phase and toluene as the mobile phase. A spot moving with the same $R_f$ (0.12) and exhibiting the same characteristic color reactions as the 11-ketoestrone obtained in Example 2 is observed.

Similarly, by following the procedure of Examples 2 to 4, but substituting 11-keto-19-nortestosterone, 11-keto-19-nor-17α-methyltestosterone, 11-keto-19-nor-17α-ethynyltestosterone for the 11-keto-19-nor-$\Delta^4$-androstene-3,17-dione, the corresponding 11-ketoestrane derivatives are obtained.

Similarly, by substituting the following 1-dehydrogenating microorganisms for the Corynebacterium simplex in Examples 2–4, the same products are formed: Nocardia restrictus ATCC–14887, Pseudomonas testosteroni, ATCC–11996, Cylindrocarpon radicicola ATCC–11011, and Mycobacterium rhodochrous ATCC–4277.

The invention may be variously otherwise embodied within the scope of the appended claims.

What is claimed is:

1. A process for preparing an 11-keto-$\Delta^{1,3,5(10)}$-estratriene, which comprises subjecting a 19-nor-$\Delta^4$-androstene serially to the action of enzymes of Corticium microsclerotia and enzymes of a 1-dehydrogenating microorganism.

2. The process of claim 1, wherein the androstene is a 3,17-dioxygenated-19-nor-$\Delta^4$-androstene.

3. The process of claim 1, wherein the androstene is 19-nor-$\Delta^4$-androstene-3,17-dione.

4. A process for preparing an 11-keto-19-nor-$\Delta^4$-androstene, which comprises subjecting a 19-nor-$\Delta^4$-androstene to the action of enzymes of Corticium microsclerotia.

5. The process of claim 4, wherein the androstene is a 3,17-dioxygenated-19-nor-$\Delta^4$-androstene.

6. The process of claim 4, wherein the androstene is 19-nor-$\Delta^4$-androstene-3,17-dione.

References Cited

UNITED STATES PATENTS

| | | | |
|---|---|---|---|
| 2,902,410 | 9/1959 | Weintraub et al. | 195—51 |
| 2,928,850 | 3/1960 | Herzog et al. | 195—51 |
| 3,037,915 | 6/1962 | Takeda et al. | 195—51 |
| 3,214,448 | 10/1965 | Holmlund et al. | 195—51 |
| 3,254,098 | 5/1966 | Edwards | 195—51 |
| 2,968,595 | 1/1961 | Greenspan et al. | 195—51 |

ALVIN E. TANENHOLTZ, *Primary Examiner.*

K465

PO-1050
(5/69)

UNITED STATES PATENT OFFICE
CERTIFICATE OF CORRECTION

Patent No. __3,429,779__  Dated __February 25, 1969__

Inventor(s) __Samuel Cheng Pan et al.__

It is certified that error appears in the above-identified patent and that said Letters Patent are hereby corrected as shown below:

Column 1, line 57, delete "10-day old agar slant cultures of Corticium microsclerotia" and add -- terone, and 11-keto-19-nor-17α-ethynyltestosterone. -- .

SIGNED AND
SEALED
NOV 18 1969

(SEAL)
Attest:

Edward M. Fletcher, Jr.
Attesting Officer

WILLIAM E. SCHUYLER, JR.
Commissioner of Patents